(No Model.)
G. E. NOYES.
Method of, and Apparatus for, Cooling Air in Buildings.
No. 237,312. Patented Feb. 1, 1881.
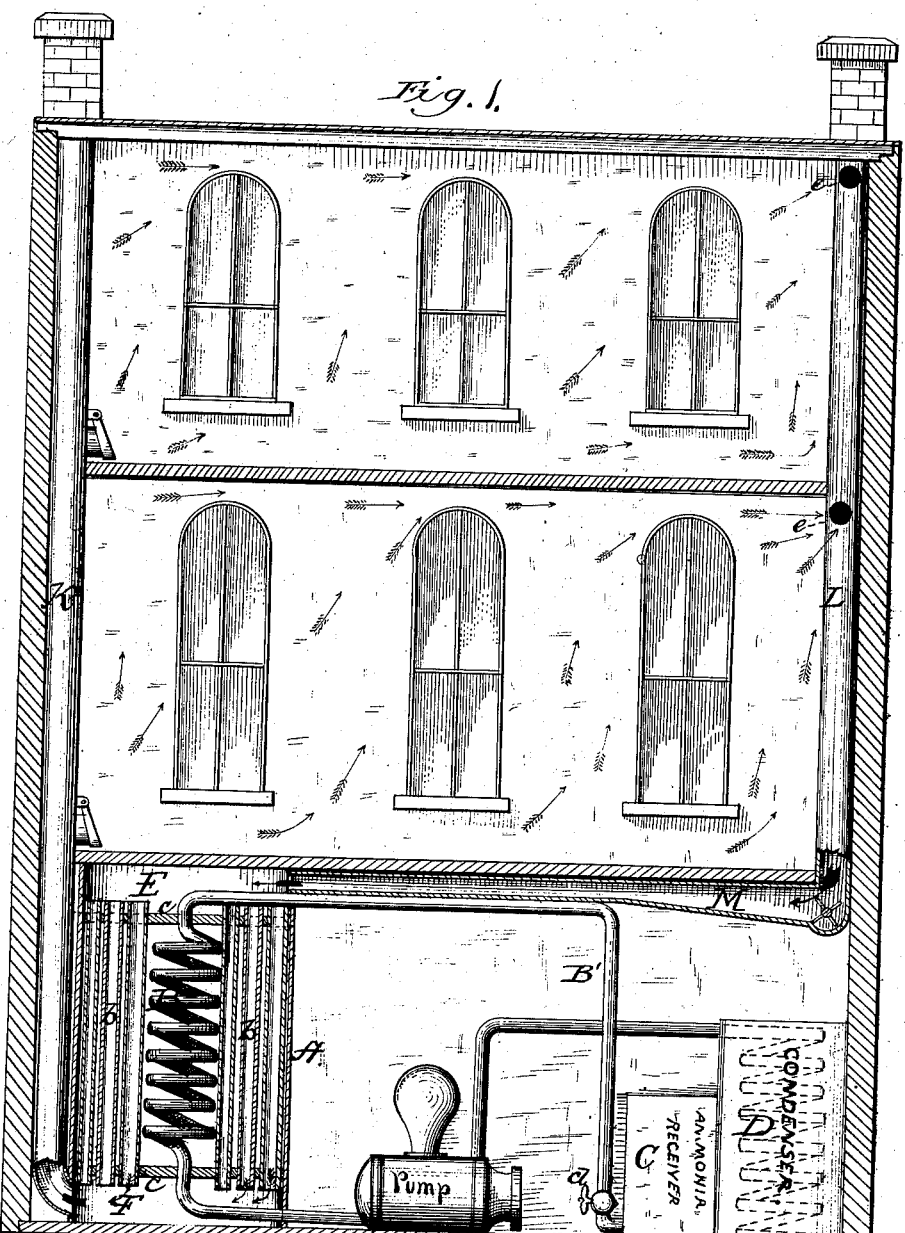

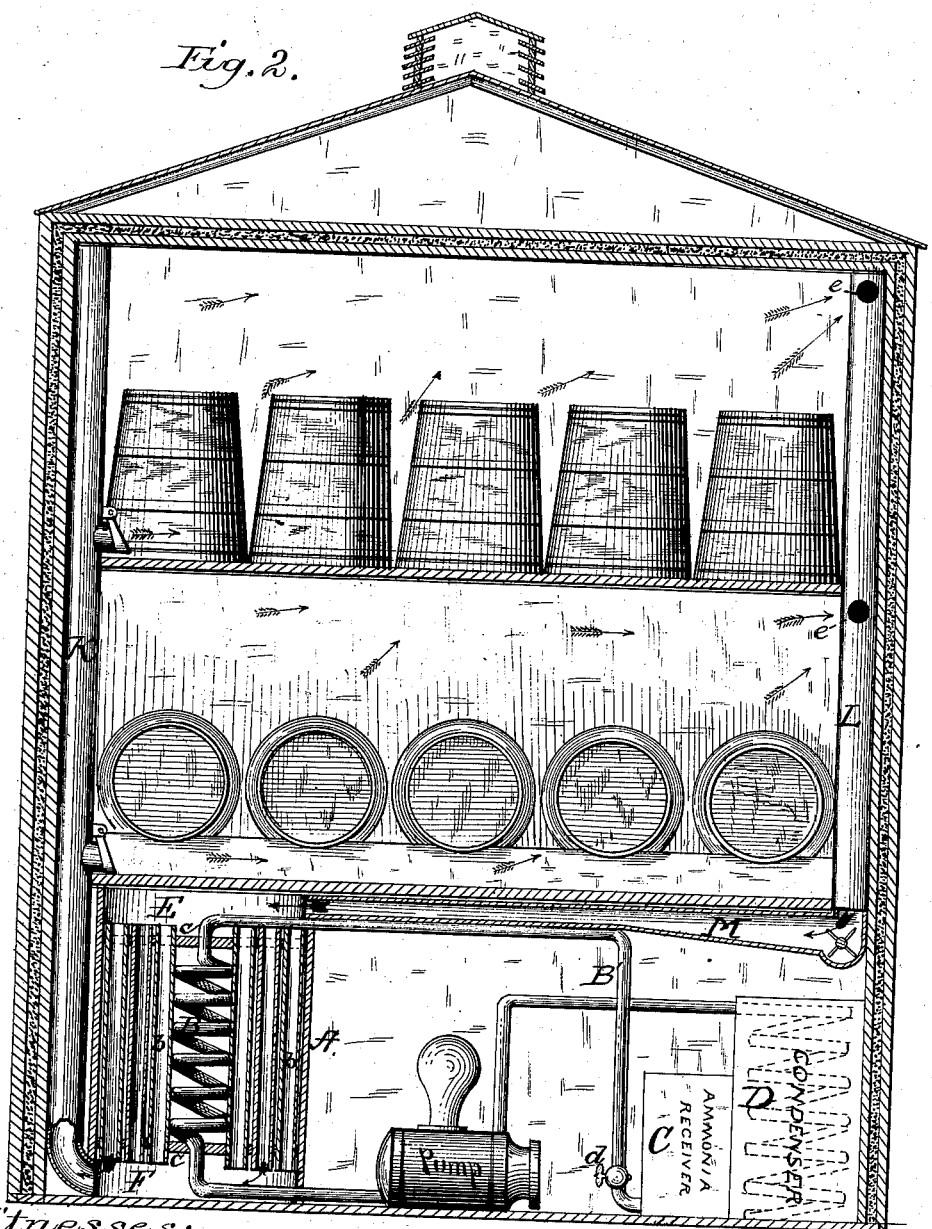

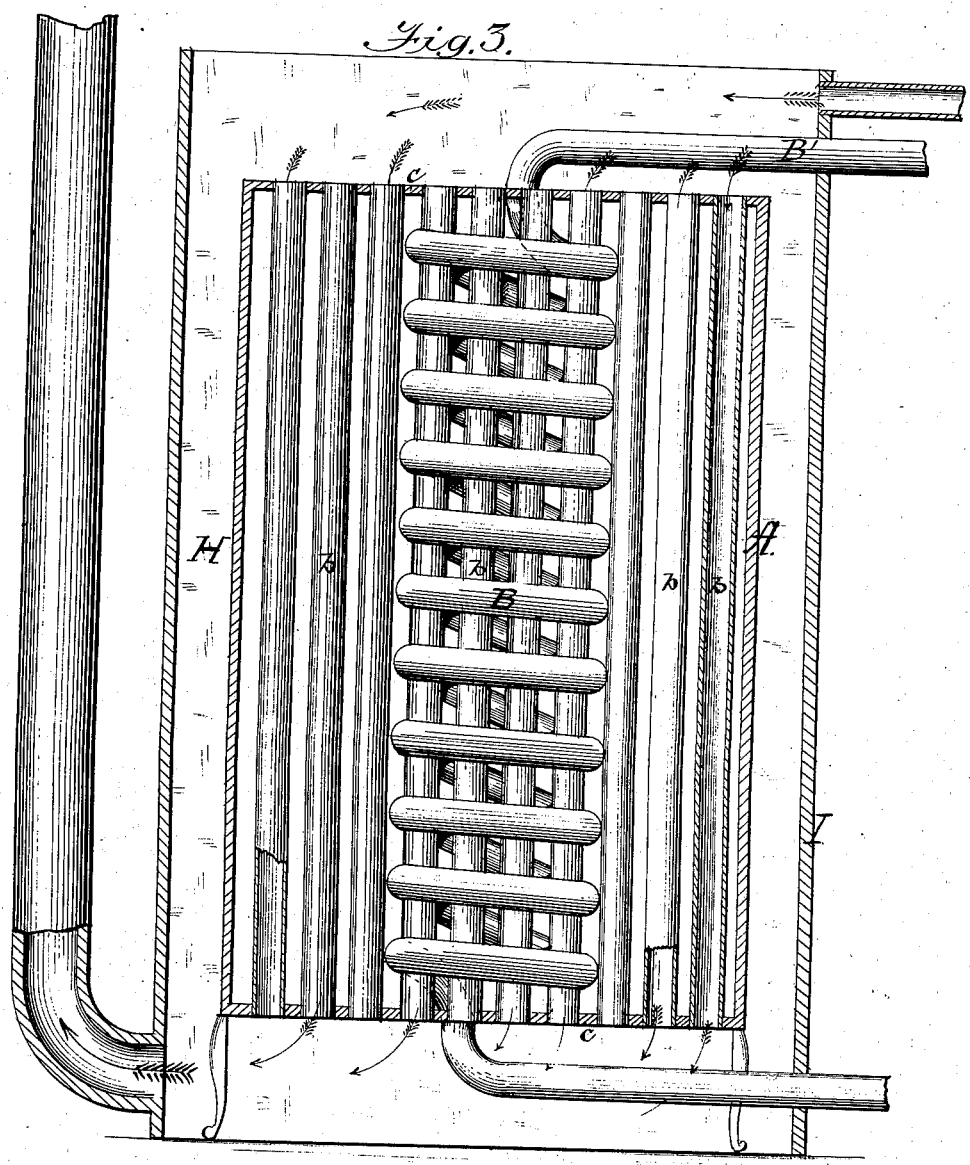

UNITED STATES PATENT OFFICE.

GEORGE E. NOYES, OF WASHINGTON, DISTRICT OF COLUMBIA.

METHOD OF AND APPARATUS FOR COOLING AIR IN BUILDINGS.

SPECIFICATION forming part of Letters Patent No. 237,312, dated February 1, 1881.

Application filed July 19, 1880. (No model.)

*To all whom it may concern:*

Be it known that I, GEORGE E. NOYES, a citizen of the United States, residing at Washington, in the county of Washington and District of Columbia, have invented certain new and useful Improvements in Methods of and Apparatus for Cooling Air in Buildings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a new method of and means for cooling and purifying the air in buildings—for example, public halls, lecture-rooms, theaters, and other rooms of a building, or the air in breweries.

It is a well-known fact that chemical and physical changes take place in the air in closed or poorly-ventilated buildings by the respiration of a number of people therein congregated, and in breweries in consequence of the fermenting-tubs in the fermenting-room; also, during the hot season it becomes a matter of great importance with the proprietors of hotels, public concert-halls, and the like, to secure the purification of the air by ventilation, and to reduce the high degree of temperature, so as to make it healthy, agreeable, and comfortable for the guests and visitors. Heretofore attempts have been made to accomplish these results, although more or less useful in some respect; but, so far as my knowledge extends, they have proved deficient, being too complicated, indifferently constructed, and unfit for the purpose to be served.

Therefore my invention consists, first, in the method of cooling air, the same consisting in reducing the temperature of a non-congealable liquid by the expansion of ammonia, or its equivalent, in a worm or coil-pipe surrounded by the said liquid, and the non-congealable liquid cooling the currents of air forced through a refrigerating apparatus by absorbing the heat and moisture from the air.

It also consists in a refrigerating apparatus having a series of tubes surrounded by a non-congealable liquid, through which the air in the apartment to be cooled and dried passes by a natural current, and a coil-pipe or worm through which passes ammoniacal gas for reducing the temperature of the non-congealable liquid surrounding the tubes.

It also consists, in combination with a refrigerating apparatus of the class described, of an air-forcing device, a flue or pipe for conducting the cooled and purified air to the apartment, and a flue or pipe for receiving and conducting the air to be cooled and purified to the refrigerating apparatus.

It also consists in the combination and arrangement of the parts, as will be hereinafter more fully set forth.

To those skilled in the art I will now describe my invention as applied to the cooling of apartments in buildings and breweries, reference being had to the annexed drawings, showing one way of carrying out the invention.

Figure 1 is a vertical sectional view of a three-story building with my air cooling and purifying method and apparatus applied thereto. Fig. 2 is a cross-section of a three-story building of a brewery with my air cooling and purifying method and apparatus applied thereto. Fig. 3 is an enlarged view of the refrigerating or air-cooling apparatus, partially in section, with a surrounding cylinder or jacket to form an additional air-cooling space. This view is intended to represent a modification of the air-cooling apparatus shown in the other views.

In my process of cooling and purifying air I employ the refrigerating apparatus composed of the cylinder A, vertically arranged, having a series of tubes, $b$, suitably connected hermetically to the heads or partitions $c$, arranged within and near the upper and lower ends of the cylinder, and a coil-pipe or worm, B, preferably centrally arranged within the cylinder. The vertical tubes open into supply and discharge chambers, located, respectively, at the upper and lower ends of the cylinder, substantially as seen in Figs. 1 and 2 of the drawings, for the purpose hereinafter set forth. The cylinder A is filled, or nearly so, with any non-congealable liquid, so as to surround the tubes and coil-pipe, and the worm or coil-pipe arranged within said cylinder is connected with the bottom of the ammonia-receiver, to receive its supply of refrigerant.

The refrigerant I prefer to use as a cooling agent is ammonia, liquefied previous to entering the coil-pipe by the combined effects of mechanical compression and condensation. The property of this agent for evaporating rapidly and cooling by the absorption of heat is well understood. The ammonia is admitted to the upper end of the coil-pipe or worm through the coupling-pipe B', provided with a suitable cock, d, extending from the base of the receiver C, and, after expanding into gas in its travel through said pipe and coil-pipe, is withdrawn from the other end of the coil-pipe by the pump and returned to the condenser D for reliquefaction, and from whence it passes into the receiver C ready for use.

The upper end of the cylinder A is formed with a chamber, E, to receive the air-currents and distribute the same through the vertical tubes to a discharge-chamber, F, below. The upper and lower ends of the cylinder will be provided with heads or caps to complete the chambers.

In Fig. 3, which represents a modification of the refrigerating apparatus shown in the other figures, the ends and heads of the vertical tubes are flush with the upper and lower ends of the cylinder A, and the upper and lower chambers, for collecting and distributing the air, as well as a surrounding chamber, H, for cooling a portion of the air, are formed by an outer cylinder, I, having suitable provisions for the passage of the pipes. The ends of this cylinder I will also be provided with heads or caps, to form the necessary chambers; also, in this figure the coil-pipe is shown surrounding several of the vertical tubes, to produce a better effect in cooling the air. In this case the air to be cooled may be passed through the tubes and forced upwardly along the outer surface of the inner cylinder, which will also act as a cooling-surface, and find an escape to the cooled air-flue at the upper end of the apparatus, instead of the escape at the lower end, as shown.

From the lower end-discharge chamber of the cylinder (see Figs. 1 and 2) extends a flue or pipe, K, passing upwardly through the several floors of the building. This flue or pipe, which should be closed at the upper end, is provided with suitable regulators or automatic valves arranged near the floor, as shown, to permit the proper escape of air to the respective apartments. As the cool and purified air escapes from the flue or pipe near the floor it becomes distributed throughout the apartment, as indicated by arrows, and, as it becomes warm, ascends to the upper portion of the apartment, seeking an exit or escape through the openings e in the flue or pipe L, which may be arranged on the opposite side of the apartment. This flue or pipe, similar to flue K, is provided at its lower end with a fan or blower, for drawing the warm air into this flue or pipe and forcing the same through the horizontal pipe M to the upper supply-chamber of the refrigerating apparatus, as indicated by the black arrow. The air from this supply-chamber is forced by the same blower downwardly through the vertical tubes of the said refrigerating apparatus to the discharge or eduction chamber, where a communication is made with the cooled-air flue or pipe, already described.

From the foregoing description it is manifest that the atmospheric currents in their passage downward through the vertical tubes b are cooled by the effects of the surrounding non-congealable liquid in contact with the outer surface of the tubes, the desired low temperature of the non-congealable liquid being maintained by contact with the coil B, which, in turn, is kept constantly cold by the effect of the passage of the ammoniacal gas through it in the manner as hereinbefore stated.

This operation of drawing warm and forcing the cool air is repeated to keep up a continuous supply of cool and purified air to the apartment or apartments.

The operation above described of cooling currents of air in buildings is substantially the same as will be employed in breweries to cool the air thereof and to draw off the air from above the tops of the fermenting-tubs in the fermenting-room, to carry off the carbonic acid and other gases of fermentation.

It is preferable that the refrigerating apparatus and means as shown and described be employed; but it is obvious that the mechanical details in the construction and arrangement of the parts may be largely varied, and I therefore claim the right to change and alter to any extent within the spirit of the invention herein disclosed.

The tops and connections employed in this apparatus are such as will not allow of the possibility of any leakage.

What I claim as my invention, and desire to secure by Letters Patent, is—

1. In the method or process of cooling air in buildings, reducing the temperature of a non-congealable liquid by the passage of ammoniacal gas in a coil-pipe or worm in contact with the non-congealable liquid, and the non-congealable liquid cooling the surfaces through which the currents of air are afterward passed, substantially as described.

2. The method hereinbefore described of cooling air in buildings, the same consisting in withdrawing warm air from the room or hall and forcing the same through tubes which are surrounded by a non-congealable liquid, the temperature of which is regulated by the passage of ammoniacal gas in a coil-pipe or worm in contact with the non-congealable liquid, and then returning the thus-cooled air to the room or hall, substantially in the manner as set forth.

3. An apparatus for cooling air in buildings, consisting of a vertical cylinder, vertical tubes, and a coil-pipe or worm, with supply and discharge air-chambers, substantially as set forth.

4. In an apparatus for cooling air in buildings, the combination of a tank or cylinder filled, or nearly so, with non-congealable liquid, a series of pipes arranged in the tank or cylinder for the passage of currents of air, and a coil-pipe or worm for the passage of ammoniacal gas, substantially as described.

5. The combination, with a cylinder filled, or nearly so, with a non-congealable liquid, a series of pipes arranged in said cylinder for the passage of currents of air, and a coil-pipe or worm for the passage of ammoniacal gas, a flue or pipe with a force-fan for conducting air to the vertical pipes to be cooled, and a flue or pipe establishing a communication with the exit-passage of the said air-pipes, for carrying off the cooled air to the desired room or apartment, substantially as described.

In testimony whereof I affix my signature in presence of two witnesses.

GEORGE E. NOYES.

Witnesses:
J. M. YZNAGA,
JAS. H. CLARK.